Oct. 7, 1958 K. O. SEILER ET AL 2,855,335
METHOD OF PURIFYING SEMICONDUCTOR MATERIAL
Filed Jan. 11, 1956
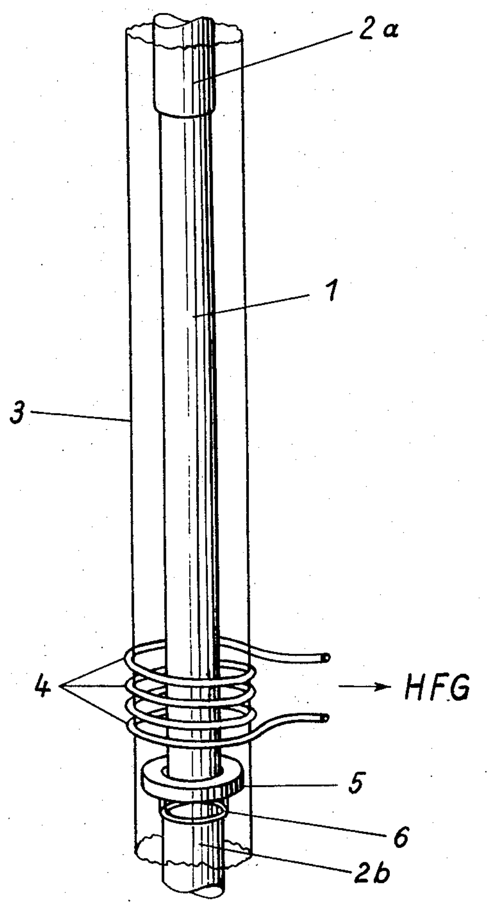
INVENTOR
BY RPMoris
ATTORNEY United States Patent Office 2,855,335
Patented Oct. 7, 1958

2,855,335

METHOD OF PURIFYING SEMICONDUCTOR MATERIAL

Karl Otto Seiler and Siegfried Eugen Muller, Nurnberg, Germany, assignors to International Standard Electric Corporation, New York, N. Y., a corporation of Delaware Application January 11, 1956, Serial No. 558,536

Claims priority, application Germany January 14, 1955

1 Claim. (Cl. 148—1.6)

The invention relates to a method of purifying semiconductor materials, in particular such materials as are used for the manufacture of semiconductive electric devices, such as crystal rectifiers and transistors.

It is well known that semiconductor materials for use with crystal rectifiers and transistors must have an extremely high degree of purity which cannot be obtained by known chemical cleaning methods. Semiconductor materials for such purposes, therefore, are subjected to a special purifying method that is based on the different solubilities of impurities in solid and liquid semi-conductor materials. In the course of the conventional process of purifying there are produced one or more liquid zones in the semiconductor material; this process is called the zone melting process. This well-known process is carried out in such a way that the semiconductor material which, preferably, has an elongated shape, is heated and melted along a narrow region or zone. By continuously displacing the source of heat relative to the semiconductor material, the zone of the molten material is slowly moved through the semiconductor material from one end to the other, carrying the impurities with it. For example, in the purification of germanium the germanium is placed into an elongated ingot of a heat-resisting material, e. g. a carbon crucible, and a zone of the germanium is heated to a melt which zone is slowly moved through the length of the material. With some semiconductor materials, however, the zone melting process cannot be utilized in the described manner, because no suitable material for the crucible is known. One such material is silicon. Even when employing crucibles of a high-purity quartz, impurities in the semi-conductor material will appear, because the silicon, when in the liquid condition, reacts with the quartz of the crucible.

In accordance with the invention, semiconductors such as silicon can be purified by the zone-melting process by forming a rod of the semiconductor material and freely suspending it, while subjecting the rod to the zone-melting process. Surprisingly, the surface tension of the molten zone is sufficient to hold the rod together and prevents the liquid portion from dropping down. The process may be carried out in an atmosphere that produces a thin layer of a chemical compound on the surface of the semiconductor material. This zone-melting process without the use of a crucible, for the melting of silicon, can be carried out e. g. in an atmosphere containing oxygen. Thereby, a thin layer of silicon dioxide is produced on the surface of the rod, that further improves the cohesion of the molten portion of the rod. In many cases, however, the surface tension of the molten material is sufficient to maintain the necessary cohesion.

One zone melting process is known which does not require a crucible. The process employs a narrow ring of molybdenum or tungsten sheet metal, that is arranged around the rod of semiconductor material, and is inductively heated to a red heat. By heat radiation of this ring, the semiconductor material within the ring is melted. By slowly moving the ring or the semiconductor rod, the molten zone is moved through the whole semiconductor material. This process, however, bears the disadvantage that the substance of the heater element act upon the heated semiconductor and contaminates the purity of the semiconductor material.

An object of the invention is to avoid the contamination of the purity of the semiconductor. The invention is based on the cognizance that the semiconductor material at high temperatures has a good conductivity and can be heated directly by means of induction.

According to the invention, therefore, the cleaning or purifying of semiconductor material, by means of a zone melting process and without the use of a crucible is carried out in such a way that the semiconductor material, after having attained a given temperature, is heated directly by means of induction. Therefore, use of intermediate elements such as heater rings is avoided. According to the further embodiment of the invention the semiconductor material is first heated up to the required temperature by means of a heater element arranged at the end of the rod of semiconductor material and is heated inductively. Thereafter the heated zone is heated further by direct induction heating. The molten zone may be moved through the semiconductor rod by arranging the rod in a vertical position, and moving it through a stationary induction coil. During this step of the process the heater element, which is arranged at one end of the rod of semiconductor material, remains cold and, therefore, is incapable of contaminating to the semiconductor material.

Carbon rings of very pure carbon are a suitable material for the heater element.

The above-mentioned and other features and objects of this invention and the manner of attaining them will become more apparent and the invention itself will be best understood by reference to the following description of an embodiment of the invention taken in conjunction with the accompanying drawing.

The vertically arranged rod of semiconductor material 1 is mounted, with the aid of the holding devices 2*a* and 2*b* which, e. g. consist of little ceramic pipes, to a device (not shown) and by means of which it can be displaced or shifted with an adjustable speed in the vertical direction. Since in many cases it may be appropriate to effect the zone refining process in a protective gas atmosphere, the semiconductor rod is arranged in a quartz pipe 3 through which a stream of suitable gas or gas mixture is led. This protective gas may consist of e. g. pure nitrogen, pure helium, etc. Closely around the quartz glass cylinder 3 there is arranged a high frequency coil 4, which is supplied with energy from a high-frequency generator (HFG). Closely above the lower end of the semiconductor rod there is arranged a ring of graphite 5 which is mounted, e. g. with the aid of a quartz pipe 6, to the holding arrangement 2*b*. The internal diameter of the said graphite ring is appropriately chosen somewhat larger than the external diameter of the semiconductor rod, whereas the external diameter of the ring is chosen thus that the ring, with a certain backlash or play, can be easily moved within the quartz pipe or quartz cylinder 3. At the beginning of the process the semiconductor rod is raised so that the graphite ring 5 will come to lie within the high-frequency coil 4. After switching on the high-frequency current the graphite ring will be inductively heated up to the glowing temperature and, by the heat radiated by this ring, the portion of the semi-conductor rod 1 inside this ring will be heated. After the semiconductor rod has reached such a temperature that its conductivity will be sufficient for inductive heating (with silicon this is the case when reaching the red-hot temperature) then the rod 1 will be moved downwards in such a way that the red-heat zone in the semiconductor rod will move in direction to the upper holding arrangement 2*a*. The movement of the semiconductor rod is effected with such a speed that the semiconductor material is not melted thereby. At the upper end of the rod there now begins the zone melting process in that the semiconductor rod is melted inductively. The melting zone is now moved slowly and in such a way through the semiconductor rod that the rod is being pulled upwards with a velocity of about 10 cm. per hour. The upward movement of the rod is stopped before the graphite ring 5 enters the high-frequency coil 4, so that said ring will remain cold.

This process may now be repeated as many times as desired.

In a specific example, the silicon rod had a diameter of 10 millimeters and the graphite ring a thickness of 3 to 4 millimeters. The inner diameter of the graphite ring was chosen in a manner that the space between the silicon rod and the graphite ring was about 2 millimeters. The induction coil had a suitable inductance and the voltage applied to the coil was 500 to 3000 volts. The silicon rod was moved upwards with a velocity of 5 to 15 cm. per hour, preferably 10 cm. per hour.

The invention is not limited to the use of silicon, but may also be advantageously employed with other semiconductor materials. The semiconductor material, purified or refined in accordance with the invention, has a particularly high degree of purity and is, therefore, excellently suitable for the manufacture of semiconducting devices, such as crystal rectifiers, transistors, and similar devices.

What is claimed is:

A method of purifying a semi-conducting rod utilizing a zone melting process, comprising supporting said rod so that the surface thereof is free of contact, mounting a closely confining non-contacting toroidal member at one end of said rod, the toroidal member being relatively highly conductive and enclosing a relatively narrow width of said rod, heating said toroidal member by subjecting it to an induction field, the radiant heat from the toroidal member heating the confined volume of said rod, continuing the heating until the electrical resistance of said volume is sufficiently reduced so that said volume is responsive directly to induction heating, inductively heating said volume until it is caused to melt, the volume constituting a relatively narrow zone, and moving said induction heating means relative to said rod so that the molten zone traverses the rod from one end to the other.

References Cited in the file of this patent

UNITED STATES PATENTS

| | | |
|---|---|---|
| 2,402,582 | Scaff | June 25, 1946 |
| 2,475,810 | Theuerer | July 12, 1949 |
| 2,686,212 | Horn et al. | Aug. 12, 1954 |
| 2,789,039 | Jensen | Apr. 16, 1957 |

FOREIGN PATENTS

| | | |
|---|---|---|
| 1,087,946 | France | Sept. 1, 1954 |

OTHER REFERENCES

Keck et al.: Review of Scientific Instruments, vol. 25, No. 4, pages 331–334.

Phys. Rev., vol. 89, March 1953, page 1297.